United States Patent
Saito et al.

(10) Patent No.: US 9,218,373 B2
(45) Date of Patent: Dec. 22, 2015

(54) IN-MEMORY DATA PROFILING

(71) Applicant: Business Objects Software Ltd., Dublin (IE)

(72) Inventors: Ricardo Saito, Fremont, CA (US); Min He, San Jose, CA (US)

(73) Assignee: Business Objects Software Ltd. (IE)

( * ) Notice: Subject to any disclaimer, the term of this patent is extended or adjusted under 35 U.S.C. 154(b) by 135 days.

(21) Appl. No.: 13/648,954

(22) Filed: Oct. 10, 2012

(65) Prior Publication Data

US 2014/0101177 A1 Apr. 10, 2014

(51) Int. Cl.
G06F 7/00 (2006.01)
G06F 17/30 (2006.01)
G06F 17/27 (2006.01)

(52) U.S. Cl.
CPC ...... G06F 17/30303 (2013.01); G06F 17/2705 (2013.01); G06F 17/30463 (2013.01); G06F 17/30539 (2013.01)

(58) Field of Classification Search
CPC ................. G06F 17/30463; G06F 17/2705
USPC ................................. 707/718, 755
See application file for complete search history.

(56) References Cited

U.S. PATENT DOCUMENTS

| | | | |
|---|---|---|---|
| 5,475,840 A * | 12/1995 | Nelson et al. | 719/331 |
| 5,842,202 A * | 11/1998 | Kon | 707/999.002 |
| 6,757,898 B1 * | 6/2004 | Ilsen et al. | 709/203 |
| 7,100,195 B1 * | 8/2006 | Underwood | 707/999.01 |
| 7,974,967 B2 * | 7/2011 | Scheuermann | 707/718 |
| 2003/0009443 A1 * | 1/2003 | Yatviskiy | 707/999.001 |
| 2003/0078960 A1 * | 4/2003 | Murren et al. | 709/203 |
| 2003/0182282 A1 * | 9/2003 | Ripley | 707/999.005 |
| 2005/0125458 A1 * | 6/2005 | Sutherland et al. | 707/201 |
| 2005/0188214 A1 * | 8/2005 | Worley et al. | 713/187 |
| 2009/0259644 A1 * | 10/2009 | Scheuermann | 707/999.004 |
| 2011/0239199 A1 * | 9/2011 | Kim et al. | 717/140 |
| 2012/0166422 A1 * | 6/2012 | Harren et al. | 707/718 |
| 2012/0259752 A1 * | 10/2012 | Agee | 705/35 |
| 2013/0065666 A1 * | 3/2013 | Schueller et al. | 463/25 |
| 2013/0110766 A1 * | 5/2013 | Promhouse et al. | 707/607 |

* cited by examiner

Primary Examiner — Usmaan Saeed
Assistant Examiner — Brian E. Weinrich
(74) Attorney, Agent, or Firm — Schwegman Lundberg & Woessner, P.A.

(57) ABSTRACT

In an example embodiment, a method of performing data profiling in an in-memory database is provided. A command requesting a data attribute calculation on data in the in-memory database may be received. A precreated procedure stored in the in-memory database may then be used to perform the data attribute calculation on the data in the in-memory database The precreated procedure may be described in a computer language utilized by the in-memory database. Finally, a result of the performing of the data attribute calculation may be returned to the client computer.

19 Claims, 8 Drawing Sheets

FIG. 5

IN-MEMORY DATA PROFILING

TECHNICAL FIELD

This document generally relates to systems and methods for use with data profiling. More specifically, this document relates methods and system for performing data profiling in-memory.

BACKGROUND

Data profiling is the process of analyzing source data and gathering information inherent to its internal metadata, data structures, content, relationships, and derivation rules. Profiling allows the user to validate data quality and track anomalies, but also to discover metadata. Currently, data profiling requires that a system first extract data from a data source and place it into a memory. The process of transferring this data can take a lot of time. The result is that data profiling is a slow process, especially as the amount of data grows, including performing table-wide or even cross-table profiling.

BRIEF DESCRIPTION OF DRAWINGS

The present disclosure is illustrated by way of example and not limitation in the figures of the accompanying drawings, in which like references indicate similar elements and in which:

FIG. 5 is a diagram illustrating a screen capture, in accordance with an example embodiment, of an information steward.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, data profiling is performed in-memory, meaning that the data profiling occurs in the memory that is storing the source data. This reduces and possibly eliminates any need to transfer the data to another memory prior to profiling it. Additionally, this allows for the flexibility of allowing multiple clusters to work in parallel to perform the data profiling, further improving the speed of such profiling.

Figure 1:
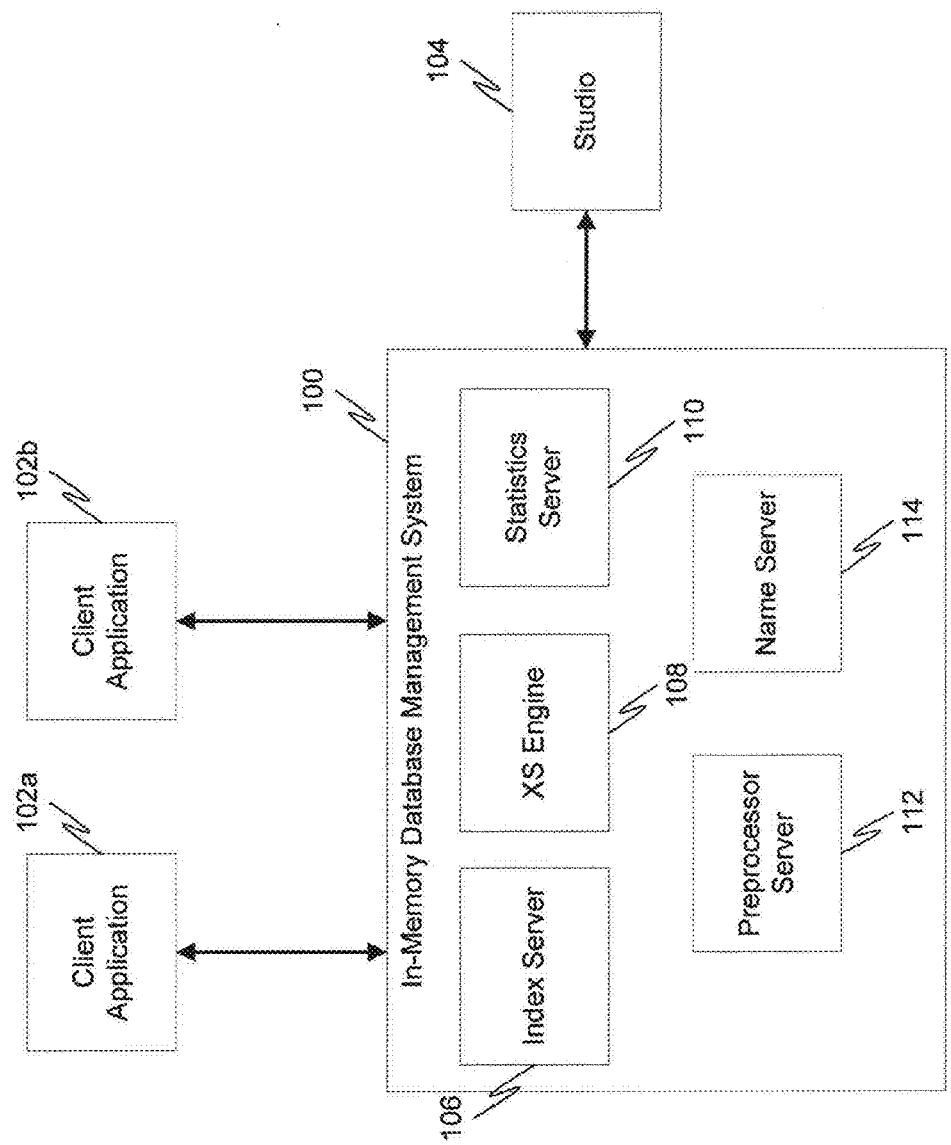
FIG. 1 is a diagram illustrating a system, in accordance with an example embodiment, to perform data profiling in-memory.

FIG. 1 is a diagram illustrating a system, in accordance with an example embodiment, to perform data profiling in-memory. An in-memory database is a database management system that primarily relies on main memory for computer data storage. It is contrasted with database management systems that employ a disk storage mechanism. One example of an in-memory database is the HANA system from SAP AG of Walldorf, Germany.

Here, an in-memory database system 100 may be coupled to one or more client applications 102a, 102b. The client applications 102a, 102b may communicate with the in-memory database system 100 through a number of different protocols, including Structured Query Language (SQL), Multidimensional Expressions (MDX), Hypertext Transfer Protocol (HTTP), Representational State Transfer (REST), and Hypertext Markup Language (HTML). In an example embodiment, unique SQL commands are created allowing the client application 102a, 102b to request that a particular data attribute calculation be performed by the in-memory database system 100. In essence, this allows the client application 102a, 102b to request that data profiling be performed without actually performing any of the data profiling calculations itself.

Data profiling computes different attributes from the data, such as minimum, maximum, mean, mode, percentile, standard deviation, frequency, variation, count, and sum. Additional metadata could include data type, length, discrete values, uniqueness, occurrence of null values, representation, and duplicates. For purposes of this document, all of these data profiling aspects may be performed as what is termed "data attribute calculations". Of course, one of ordinary skill in the art will recognize that the data attribute calculations could also include other calculations not specifically described here.

Also depicted is a studio 104, used to perform modeling by accessing the in-memory database system 100.

The in-memory database system 100 may comprise a number of different components, including index server 106, XS engine 108, statistics server 110, preprocessor server 112, and name server 114. These components may operate on a single computing device, or may be spread among multiple computing devices (e.g., separate servers).

In an example embodiment, the index server 106 contains the actual data and the engines for processing the data. It also coordinates and uses all the other servers. In an example embodiment, new procedures are defined in the index server 106 to perform various data attribute calculations when requested by a client application 102a, 102b. In a further example embodiment, these new procedures are designed to receive and interpret SQL commands from the client applications 102a, 102b.

The name server 114 holds information about the database topology. This is used in a distributed system with instances of the database on different hosts. The name server 114 knows where the components are running and which data is located on which server.

The statistics server 110 collects information about status, performance, and resource consumption from all the other server components. The statistics server 110 can be accessed from the studio 104 to obtain the status of various alert monitors.

The preprocessor server 112 is used for analyzing text data and extracting the information on which the text search capabilities are based.

The XS engine 108 allows clients to connect to the database system 100 using HTTP.

Figure 2:
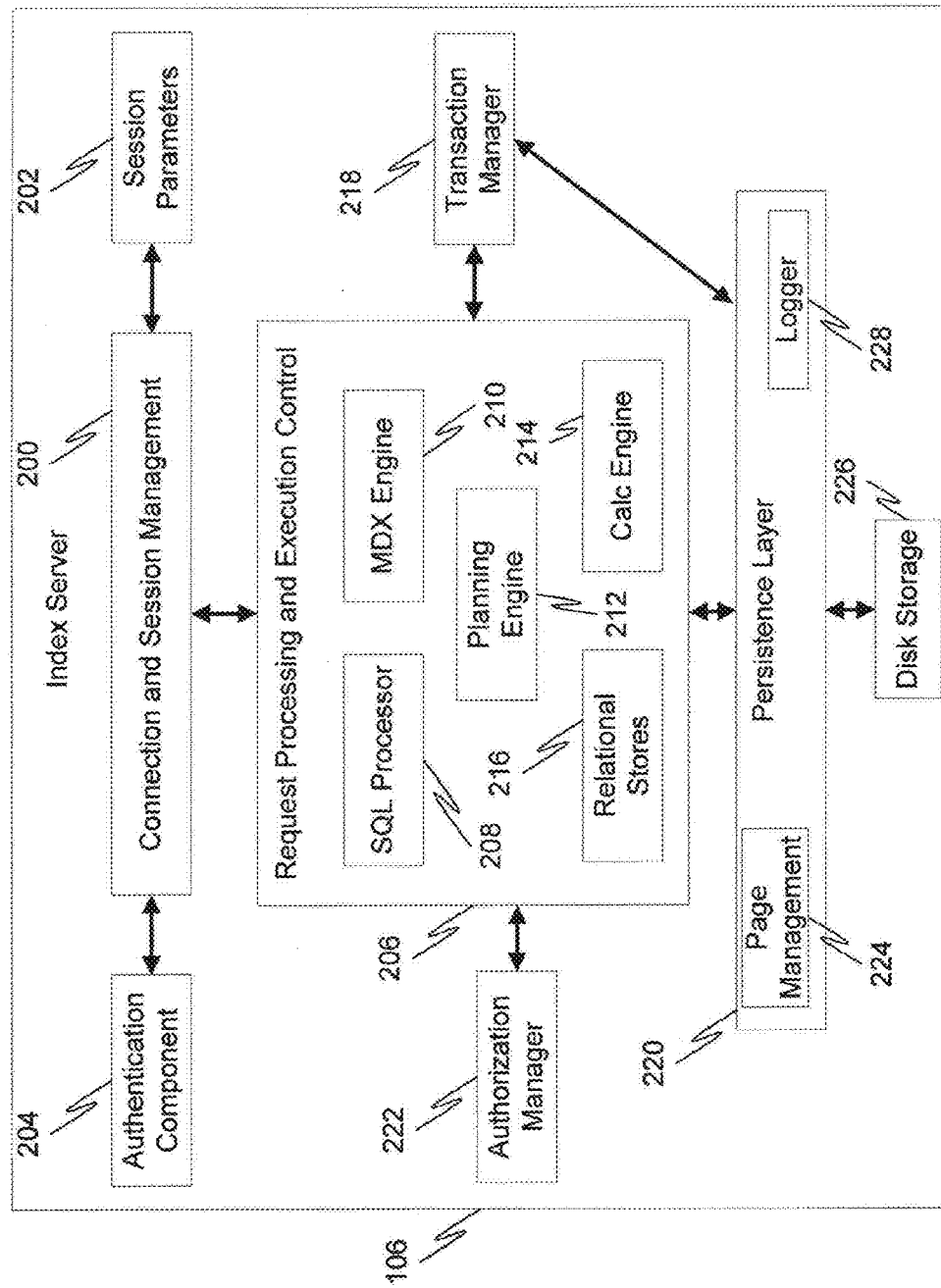
FIG. 2 is a diagram illustrating an index server in accordance with an example embodiment.

FIG. 2 is a diagram illustrating an index server in accordance with an example embodiment. The index server may, in some embodiments, be utilized as the index server 106 in the system of FIG. 1. The index server includes a connection and session management component 200, which is responsible for creating and managing sessions and connections for the database clients. Once a session is established, clients can communicate with the database system (e.g., database system 100 of FIG. 1) using SQL statements. For each session, a set of session parameters 202 may be maintained, such as autocommit, current transaction isolation level, etc. Users are authenticated either by the database system itself (e.g., login with user name and password, using authentication component 204) or authentication can be delegated to an external authentication provider such as a Lightweight Directory Access Protocol (LDAP) directory.

The client requests can be analyzed and executed by a set of components summarized as request processing and execution control 206. The SQL processor 208 checks the syntax and semantics of the client SQL statements and generates a logical execution plan. Multidimensional expressions (MDX) is a language for querying and manipulating multidimensional data stored in OLAP cubes. As such, an MDX engine 210 is provided to allow for the parsing and executing of MDX commands. A planning engine 212 allows financial planning applications to execute basic planning operations in the database layer. One such operation is to create a new version of a dataset as a copy of an existing dataset, while applying filters and transformations.

A calc engine 214 implements the various SQL script and planning operations. The calc engine 214 creates a logical execution plan for calculation models derived from SQL script, MDX, planning, and domain-specific models. This logical execution plan may include, for example, breaking up a model into operations that can be processed in parallel.

The data is stored in relational stores 216, which implement a relational database in main memory.

Each SQL statement may be processed in the context of a transaction. New sessions are implicitly assigned to a new transaction. The transaction manager 218 coordinates database transactions, controls transactional isolation, and keeps track of running and closed transactions. When a transaction is committed or rolled back, the transaction manager 218 informs the involved engines about this event so they can execute necessary actions. The transaction manager 218 also cooperates with a persistence layer 220 to achieve atomic and durable transactions.

An authorization manager 222 is invoked by other database system components to check whether the user has the required privileges to execute the requested operations. The database system allows for the granting of privileges to users or roles. A privilege grants the right to perform a specified operation on a specified object.

The persistence layer 220 ensures that the database is restored to the most recent committed state after a restart and that transactions are either completely executed or completely undone. To achieve this goal in an efficient way, the persistence layer 220 uses a combination of write-ahead logs, shadow paging, and save points. The persistence layer 220 also offers a page management interface 224 for writing and reading data to a separate disk storage 226, and also contains a logger 228 that manages the transaction log. Log entries can be written implicitly by the persistence layer 220 when data is written via the persistence interface or explicitly by using a log interface.

Figure 3:
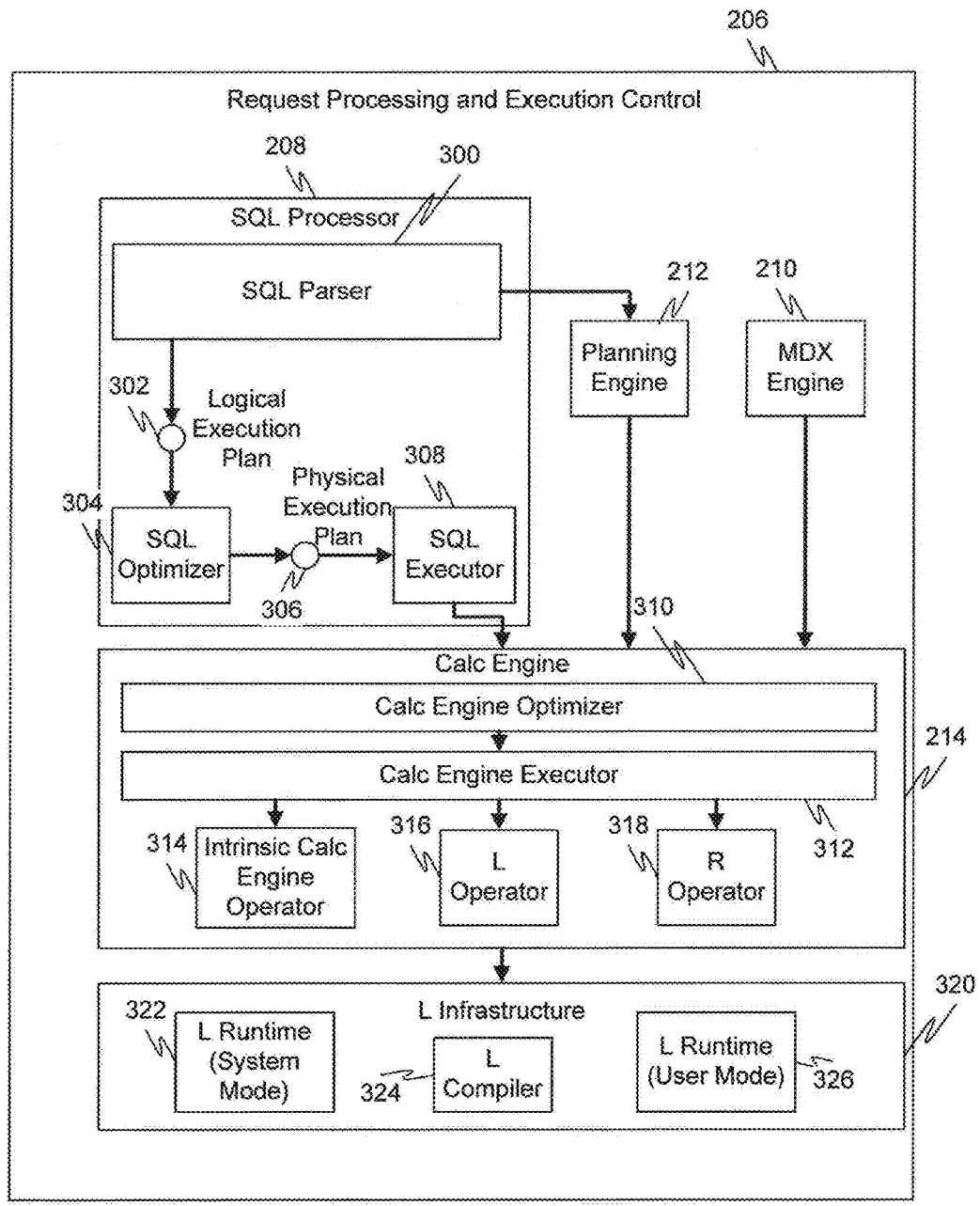
FIG. 3 is a diagram illustrating a system, in accordance with an example embodiment, to perform request processing and execution control component.

FIG. 3 is a diagram illustrating a system, in accordance with an example embodiment, to perform request processing and execution control component in accordance with an example embodiment. In one embodiment, the system may be implemented as the request processing and execution control 206 in the system depicted in FIG. 2. The SQL processor 208 contains an SQL Parser 300, which parses the SQL statement and generates a logical execution plan 302, which it passes to SQL optimizer 304. The SQL optimizer 304 then optimizes the logical execution plan 302 and converts it to a physical execution plan 306, which it then passes to SQL executor 308. The calc engine 214 implements the various SQL script and planning operations, and includes a calc engine optimizer 310, which optimizes the operations, calc engine executor 312, which executes the operations, as well as intrinsic calc engine operator 314, L operator 316, and R operator 318. Most notably for the data profiling aspect, the L operator 316 interfaces with L infrastructure 320 to run custom L operations corresponding to data attribute calculations. L is a computer language built upon C++. Roughly speaking, it wraps a C-like syntax around core tool command language (TCL) functionality.

L infrastructure 320 includes a number of components to aid in the running of L procedures, including L-runtime (system mode) 332, L compiler 324, and L-runtime (User mode) 326.

As described briefly above, in an example embodiment, a technique is provided allowing data profiling to be performed in-memory, providing high quality calculations in little time. In this example embodiment, all relevant data is kept in main memory, so that read operations can be executed without requiring disk input and output. Additionally, data is stored in columns. This allows for the use of high compression techniques, high performance reading contiguous data for column operations, and parallelization of the column processing. In a column store, data is already vertically partitioned. This means that operations on different columns can be easily processed in parallel. If multiple column need to be searched or aggregated, each of these operations can be assigned to a different processor core and/or computer cluster. In addition, the execution of operations within a single column can be further parallelized by dividing the column into multiple sections that are processed by different processor cores.

Figure 4:
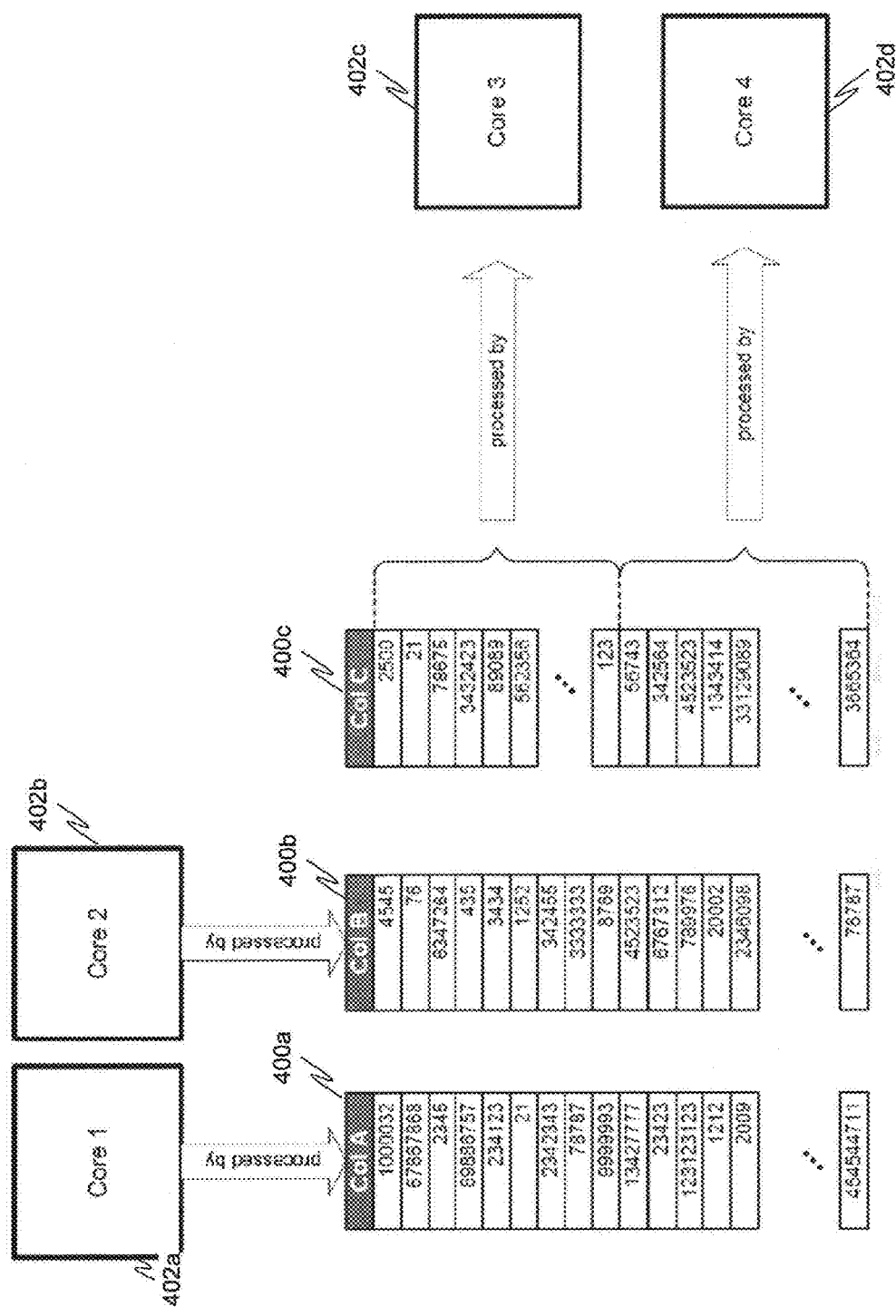
FIG. 4 is a diagram illustrating a method, in accordance with an example embodiment, to perform parallel processing.

FIG. 4 is a diagram illustrating a method to perform parallel processing in accordance with an example embodiment. Here, three columns 400a, 400b, 400c are depicted. The processing of column 400a can be performed by a first core 402a. The processing of column 400b can be performed by a second core 402b. The processing of column 400c can actually be split among two cores 402c, 402d.

In an example embodiment, specialized client software may be run by one or more client machines interfacing with the database system. This specialized client software may be known as an information steward, and may combine the functionality for data profiling, metadata management, and data quality monitoring in a unified framework. The solution provides tools that help companies perform data assessments, view data lineage, and improve data traceability to support governance initiatives.

In another example embodiments, business objects data services software is run on the client. In such an embodiment, a single enterprise-class solution is used for data integration, data quality, data profiling, and text data processing that allows users to integrate, transform, improve, and deliver trusted data to critical business processes.

Since both types of software run data profiling and are located on clients, the various data profiling techniques described herein can be run on either type of software. More particularly, SQL or other database control statements can be implemented in either business objects data services software or information steward software, which then can be used to interface with an index server containing data attribute calculations. Therefore, while in the past such software would perform the data profiling itself, causing the previously mentioned delays, now the software can leverage the strength of the index server to greatly improve performance of data profiling techniques.

Figure 5:
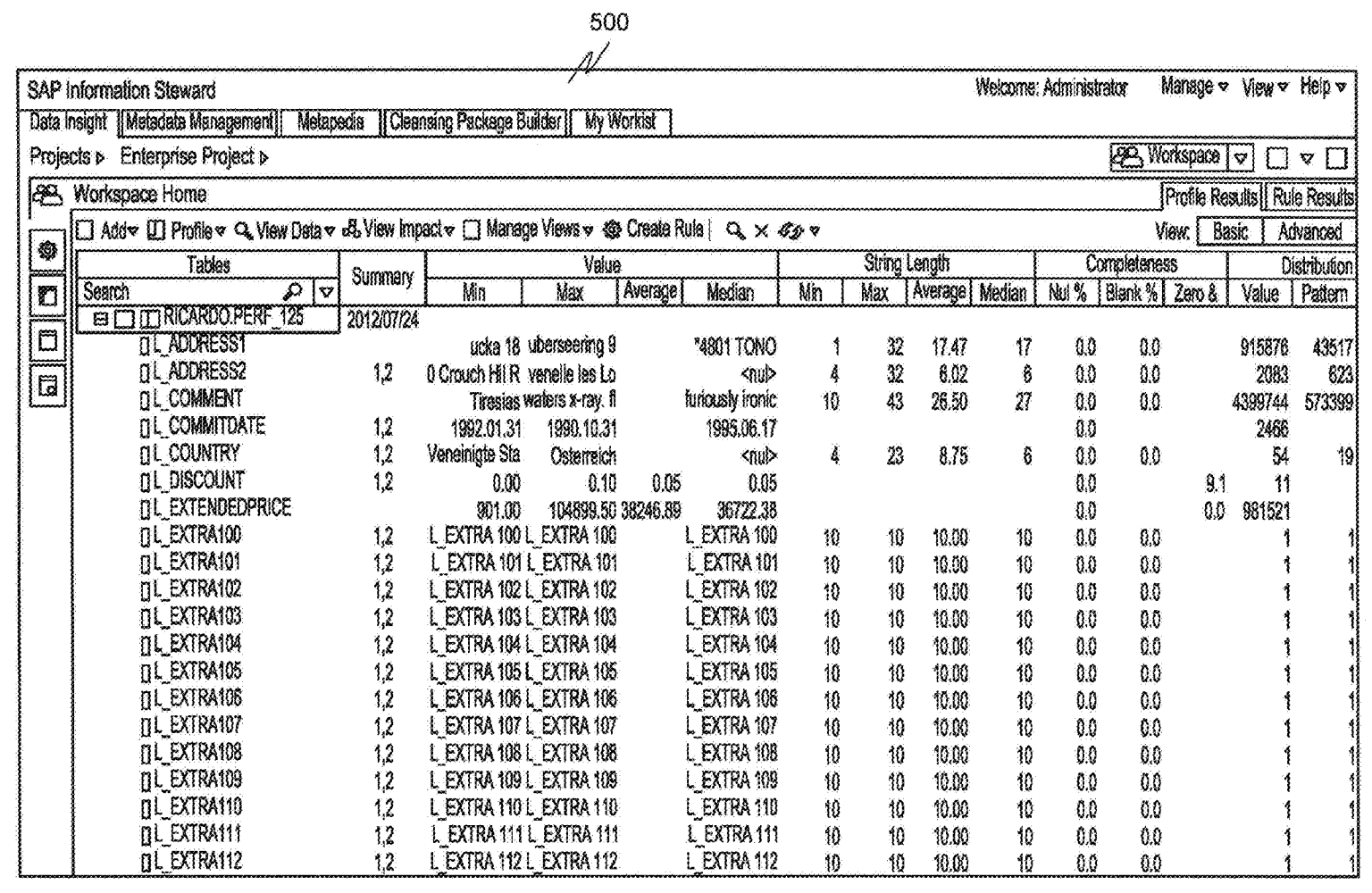

FIG. 5 is a diagram illustrating a screen capture, in accordance with an example embodiment, of an information steward. This screen shows a user interface showing a dashboard 500 where various data attribute statistics can be displayed. The information steward can create tasks based on tables and columns, selecting two levels of detail. The first level is simple, covering the attributes such as value min, value max, value average, value median, counts, string length min, string length max, string length average, string length median, blanks, median, and zeroes. The second level is with distribution, covering the number and frequency of distinct values in the data and pattern of the data. The pattern attribute is an algorithm that translates the data into a simple format, which can be grouped to find data set patterns. Briefly, it translates words into representations formed of the letters 'X', 'x', and '9' when finding upper, lower, and numeric characters, respectively.

Because the tests cover the replacement of the information steward profiling engine, it focuses on the same profiling attributes. Other profiling attributes, of course, can be derived using the same techniques.

In an example embodiment, any data attribute calculation that can be calculated using a SQL query can be implemented in a way to allow the information steward to generate such a SQL query. This would include data attribute calculations such as min, max, count, null counts, blanks, zeroes, and string length. For other data attribute calculations that may not be computed using pure SQL script, procedures and functions can be utilized. Examples of such other data attribute calculations include median and pattern.

SQL script is a high-level language used to control and manipulate the dataflow, allowing a developer to create high performance and concurrent execution code. When data transformation and complex data manipulation are necessary, extra support can be provided using the scalar language L. L is natively compiled, allowing the developer to implement high performance operators called from SQL script.

It should be noted that implementations using alternative programming languages, such as C++ and R, are also foreseen.

Figure 6:
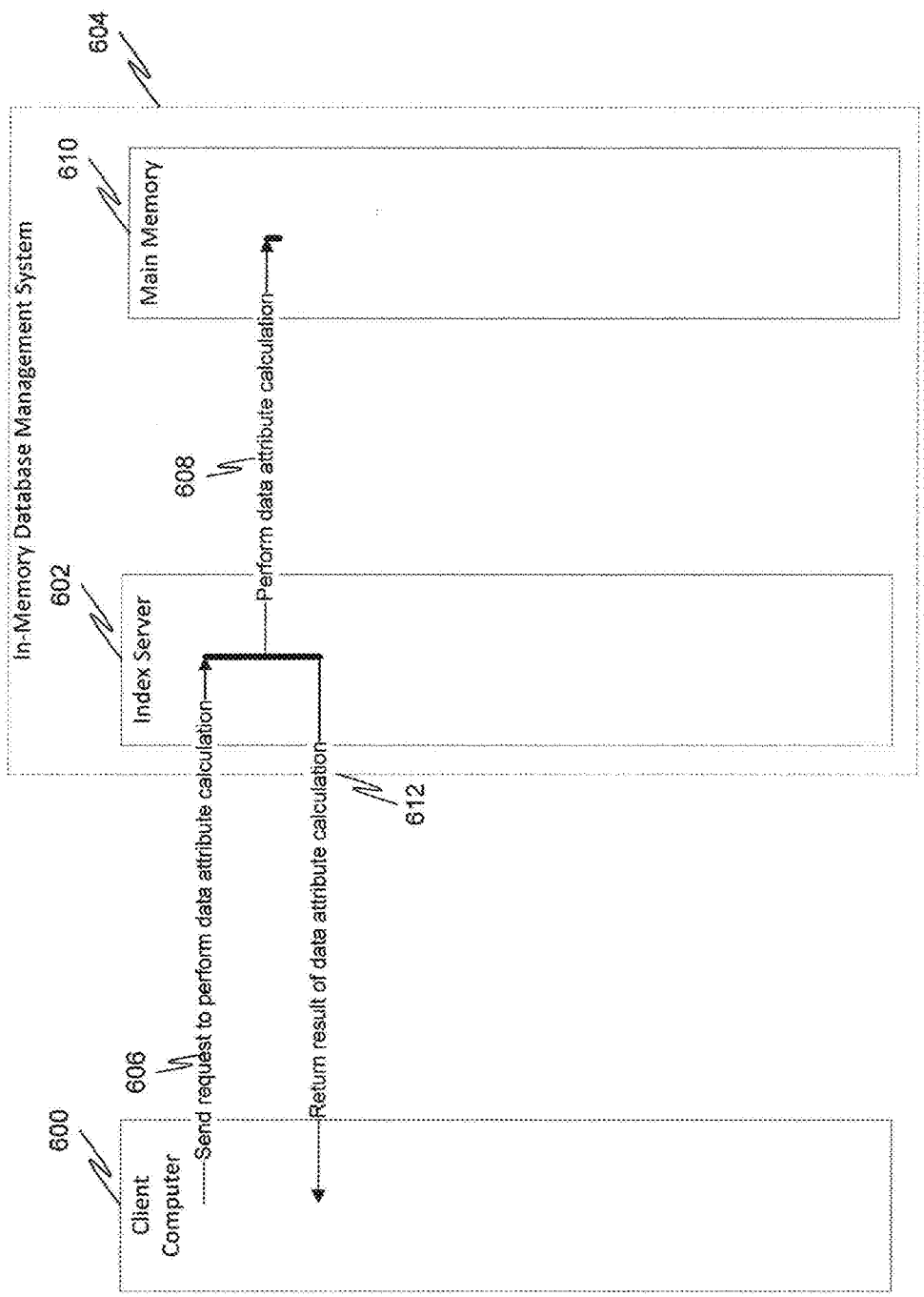
FIG. 6 is an interaction diagram illustrating a method, in accordance with an example embodiment, to perform data profiling in accordance with an example embodiment.

FIG. 6 is an interaction diagram illustrating a method, in accordance with an example embodiment, to perform data profiling in accordance with an example embodiment. A client computer 600 may generate a request to perform a data attribute calculation and, at 606, send the request to an index server 602 of an in-memory database management system 604. At 608, the index server 602 can perform the requested data attribute calculation on data stored in-memory in a main memory 610 of the in-memory database management system 604. At 612, the index server 602 can return the result of the data attribute calculation to the client computer 600.

Figure 7:
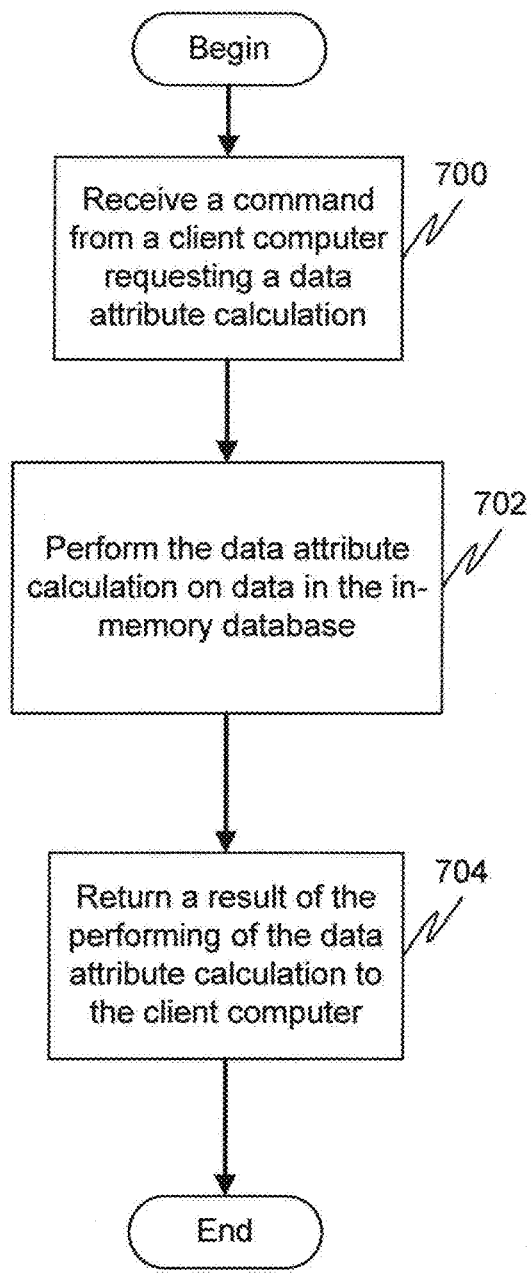
FIG. 7 is a flow diagram illustrating a method, in accordance with an example embodiment, to perform data profiling in an in-memory database.

FIG. 7 is a flow diagram illustrating a method, in accordance with an example embodiment, to perform data profiling in an in-memory database. At 700, a command is received from a client computer requesting a data attribute calculation on data in the in-memory database. At 702, the data attribute calculation is performed on the data in the in-memory database by utilizing a precreated procedure in the in-memory database. At 704, a result of the performing of the data attribute calculations is returned to the client computer.

As described above, the procedures used in the index server to perform the data attribute calculations may be written in SQL script and L language. What follows are example procedures, and these examples are not intended to be limiting:

Example Procedure Calculate Profile Data

```
1 CREATE PROCEDURE PROFILE_DATA
2 (
3 IN DATA T_ANALYZE_VARCHAR_DATA,
4 OUT RESULT T_ANALYZE_RESULT
5 )
6 LANGUAGE SQLSCRIPT
7 READS SQL DATA
8 AS
9 BEGIN
10 TEMP = select MIN("VALUE") as "MIN_VAL",
11 MAX("VALUE") as "MAX_ VAL",
12 MIN(LENGTH("VALUE")) as "MIN_LEN",
13 MAX(LENGTH("VALUE")) as "MAX_LEN",
14 AVG(LENGTH("VALUE")) as "AVG_LEN",
15 COUNT(*)- COUNT("VALUE") AS "ROWS_NULL",
16 (select count("VALUE") from :DATA where VALUE = '') AS "ROWS_BLANK",
17 count( distinct "VALUE") as "DISTINCT_VALUES",
18 COUNT(*) AS "TOTAL_ROWS"
19 from :DATA;
20 CALL MEDIAN_CALCULATE_VARCHAR(:DATA, TEMP2);
21 DATA2 = select TO_DOUBLE(LENGTH("VALUE")) as "VALUE" from :DATA order by 1;
22 CALL MEDIAN_CALCULATE_DOUBLE(:DATA2, TEMP3);
23 CALL GENERATE_PATTERN(:DATA, TEMP4);
24 TEMP5 = select COUNT( DISTINCT "CATEGORY" ) as "PATTERN_COUNT" from :TEMP4;
25 RESULT =
CE_VERTICAL_UNION(:TEMP,["MIN_VAL","MAX_VAL",
"MIN_LEN","MAX_LEN","AVG_LEN",
26 "ROWS_NULL", "ROWS_BLANK", "DISTINCT_VALUES",
"TOTAL_ROWS"],
27 :TEMP2,["VALUE" as "MEDIAN"], :TEMP3, ["VALUE" as "MEDIAN_LEN"], :TEMP5,
[("PATTERN_COUNT"]);
28 END;
```

Example Procedure Generate Patterns

```
1 CREATE PROCEDURE GENERATE_PATTERN
2 (
3 IN VALOR T_PATTERN_VALUE,
4 OUT CATEGORY T_PATTERN_CATEGORY
5 )
6 LANGUAGE LLANG
7 READS SQL DATA
8 AS
9 BEGIN
10 typedef Table<String "VALUE"> T_PATTERN_VALUE;
11 typedef Table<String "CATEGORY"> T_PATTERN_CATEGORY;
12 String pattern(String value) {
13 if (value.isEmpty( )) {
14 return value;
15 }
16 Size i = 0z;
SAP Invention Disclosure Form Attachment - In Memory Profiling: using HANA to perform Data Profiling 10
17 Size len = value.getLength( );
18 String pattern = String( );
19 try {
20 while (i < len) {
21 String c = value.substring7Bit(i, 1z);
```

```
22 if (c >= "0" && c <= "9" ) {
23 pattern.append("9");
24 } else if (c >= "A" && c <= "Z") {
25 pattern.append("X");
26 } else if (c >= "a" && c <= "z") {
27 pattern.append("x");
28 } else {
29 pattern.append(c);
30 }
31 i = i.next( );
32 }
33 } catch (Exception::ArgumentValue) {
34 pattern = value;
35 }
36 return pattern;
37 }
38 export Void main(T_PATTERN_VALUE valor,
T_PATTERN_CATEGORY & category)
39 {
40 Column<String> col_value = valor."VALUE";
41 Size row = 0z;
42 Size num_rows = col_value.getSize( );
43 Column<String> col_category = category."CATEGORY";
44 while (row < num_rows) {
45 if (!col_value.isNull(row)) {
46 col_category[row] = pattern(col_value[row]);
47 }
48 row = row.next( );
49 }
50 }
51 END;
```

Example Procedure Calculate Median

```
1 CREATE PROCEDURE MEDIAN_CALCULATE_VARCHAR (
2 IN DATA T_ANALYZE_VARCHAR_DATA,
3 OUT RESULT T_ANALYZE_VARCHAR_DATA
4 )
5 LANGUAGE LLANG
6 READS SQL DATA
7 AS
8 BEGIN
9 typedef Table<String "VALUE">
TY_ANALYZE_VARCHAR_DATA;
10 export Void main(TY_ANALYZE_VARCHAR_DATA data,
TY_ANALYZE_VARCHAR_DATA & result) {
11 Column<String> col_value = data.getColumn<String>("VALUE");
12 Column<String> col_result = result.getColumn<String>("VALUE");
13 Double percentile = Double("0,5");
14 String lv_percentile;
15 Size num_rows = col_value.getSize( );
16 Double row_count = Double(num_rows);
17 Double rn_rowind = percentile * (row_count − Double("1"));
18 Int32 frn_rowind = Int32(math::floor(rn_rowind));
19 lv___percentile = col_value[Size(frn_rowind)];
20 col_result.setElementRange(0z, 1z, lv_percentile);
21 }
SAP Invention Disclosure Form Attachment - In Memory Profiling: using
HANA to perform Data Profiling 11
22 END;
```

Example Table Types

```
1 CREATE TYPE T_PATTERN_VALUE
2 AS TABLE
3 (
4 "VALUE" VARCHAR
5 );
6 CREATE TYPE T_PATTERN_CATEGORY
7 AS TABLE
8 (
9 "CATEGORY" VARCHAR
10 );
11 CREATE TYPE T_ANALYZE_VARCHAR_DATA
12 AS TABLE
13 (
14 "VALUE" VARCHAR
15 );
16 CREATE TYPE T_ANALYZE_PATTERN_COUNT
17 AS TABLE
18 (
19 "PATTERN" VARCHAR,
20 "QTD" INTEGER
21 );
22 CREATE TYPE T_ANALYZE_RESULT
23 AS TABLE
24 (
25 "MIN_VAL" VARCHAR,
26 "MAX_VAL" VARCHAR,
27 "MIN_LEN" INTEGER,
28 "MAX_LEN" INTEGER,
29 "AVG_LEN" INTEGER,
30 "ROWS_NULL" INTEGER,
31 "ROWS_BLANK" INTEGER,
32 "DISTINCT_VALUES" INTEGER,
33 "TOTAL_ROWS" INTEGER,
34 "MEDIAN" VARCHAR,
35 "MEDIAN_LEN" DOUBLE,
36 "PATTERN_COUNT" INTEGER,
37 );
```

Figure 8:
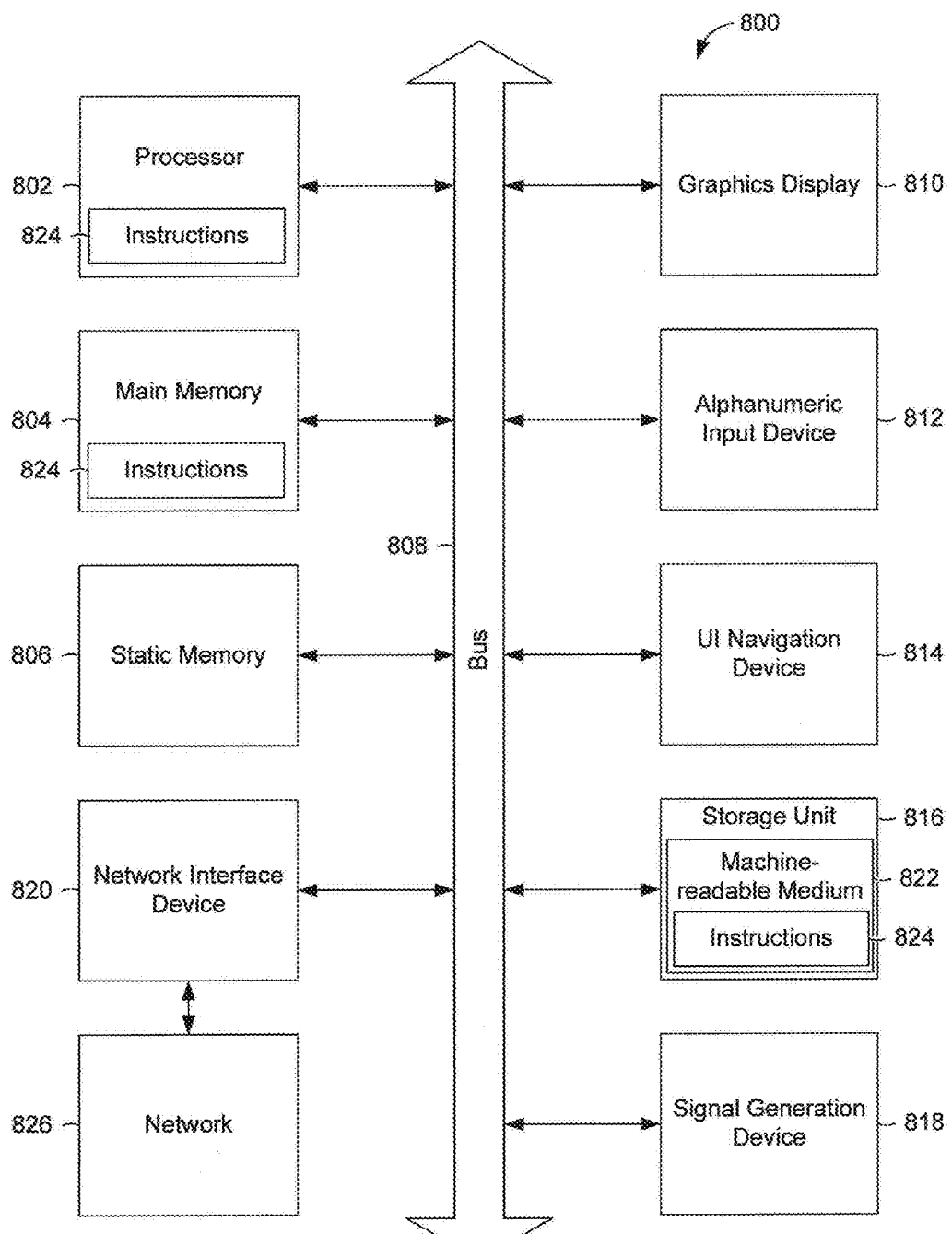
FIG. 8 is a block diagram of a computer processing system at a server system, within which a set of instructions for causing the computer to perform any one or more of the methodologies discussed herein may be executed.

FIG. 8 is a block diagram of a computer processing system at a server system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 802 (e.g., a central processing unit (CPU), a graphics processing unit (GPU) or both), main memory 804 and static memory 806, which communicate with each other via bus 808. The processing system 800 may further include graphics display 810 (e.g., a plasma display, a liquid crystal display (LCD) or a cathode ray tube (CRT)). The processing system 800 also includes alphanumeric input device 812 (e.g., a keyboard), a user interface (UI) navigation device 814 (e.g., a mouse, touch screen, or the like), a storage unit 816, a signal generation device 818 (e.g., a speaker), and a network interface device 820.

The storage unit 816 includes machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the processing system 800, the main memory 804 and the processor 802 also constituting computer-readable, tangible media.

The instructions 824 may further be transmitted or received over network 826 via a network interface device 820 utilizing any one of a number of well-known transfer protocols (e.g., HTTP).

While the machine-readable medium 822 is shown in an example embodiment to be a single medium, the term "machine-readable medium" should be taken to include a single medium or multiple media (e.g., a cenralized or distributed database, and/or associated caches and servers) that store the one or more sets of instructions 824. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of performing data profiling in an in-memory database management system, the method comprising:
   receiving a command from a client computer, the command requesting a data attribute calculation on data in the in-memory database management system, the in-memory database management system storing the data in main memory in lieu of storing the data in a disk-based storage;
   performing the data attribute calculation on the data in the in-memory database management system by utilizing a precreated data attribute calculation procedure in the in-memory database management system, the precreated data attribute calculation procedure written in a database computer language in which the command requesting the data attribute calculation is sent to the in-memory database management system along with script of the database computer language and stored in main memory in lieu of being stored in a disk-based storage, the data attribute calculation including a statistical function on one or more columns of the data, the precreated data attribute calculation procedure being natively compiled and including support to implement high performance operators called from the script of the database computer language; and
   returning a result of the performing of the data attribute calculation to the client computer.

2. The method of claim 1, wherein the data attribute calculation includes pattern recognition on one or more columns of the data.

3. The method of claim 1, wherein the performing the data attribute calculation includes creating a logical execution plan for the data attribute calculation, wherein the logical execution plan breaks the data attribute calculation into a plurality of sub-calculations based on columns of the data, wherein each sub-calculation is assigned to a different computing cluster for execution in parallel.

4. The method of claim 1, wherein the command is a Structured Query Language (SQL) command.

5. The method of claim 1, wherein the computer language utilized by the in-memory database management system is L.

6. The method of claim 1, wherein the in-memory database management system persists data primarily in Random Access Memory (RAM).

7. An in-memory database management system comprising:
   main memory; and
   an index server configured to persist data in the main memory in lieu of a disk-based storage and to receive database commands from one or more clients, the database commands including a request for a data attribute calculation on data in the main memory, the index server further configured to perform the data attribute calculation on the data in the in-memory database by utilizing a precreated data attribute calculation procedure in the in-memory database management system, the precreated data attribute calculation procedure written in a database computer language in which the command requesting the data attribute calculation is sent to the in-memory database management system along with script of the database computer language and stored in main memory in lieu of being stored in a disk-based storage, the data attribute calculation including a statistical function on one or more columns of the data, the precreated data attribute calculation procedure being natively compiled and including support to implement high performance operators called from the script of the database computer language.

8. The in-memory database management system of claim 7, further comprising a statistics server configured to collect information about status, performance, and resource consumption from components in the in-memory database management system.

9. The in-memory database management system of claim 7, further comprising a name server holding information about database topology.

10. The in-memory database management system of claim 7, wherein the index server comprises:
   a connection and session management component configured to create and manage sessions and connections for the one or more clients;
   a request processing and execution control component configured to analyze and execute the request, wherein the request processing and execution control component includes a SQL parser, a planning engine, and a calc engine; and
   a persistence layer configured to ensure data stored in the main memory persists after a restart.

11. The in-memory database management system of claim 7, wherein the index server is configured to connect to a studio capable of performing modeling on data stored in the main memory of the in-memory database management system.

12. The in-memory database management system of claim 7, wherein the main memory stores data as a relational database.

13. The in-memory database management system of claim 7, wherein the index server further comprises an L compiler.

14. The in-memory database management system of claim 7, wherein the data attribute calculation includes a statistical function on one or more columns of the data.

15. The in-memory database management system of claim 7, wherein the data attribute calculation includes pattern recognition on one or more columns of the data.

16. A non-transitory computer-readable storage medium comprising instructions that, when executed by at least one processor of a machine, cause the machine to perform operations of performing data profiling in an in-memory database management system, the operations comprising:
   receiving a command from a client computer, the command requesting a data attribute calculation on data in the in-memory database management system, the in-memory database management system storing the data in main memory in lieu of storing the data in a disk-based storage;
   performing the data attribute calculation on the data in the in-memory database management system by utilizing a precreated data attribute calculation procedure in the in-memory database management system, the precreated data attribute calculation procedure written in a database computer language in which the command requesting the data attribute calculation is sent to the in-memory database management system along with script of the database computer language and stored in main memory in lieu of being stored in a disk-based storage, the data attribute calculation including a statistical function on one or more columns of the data, the precreated data attribute calculation procedure being natively compiled and including support to implement high performance operators called from the script of the database computer language; and
   returning a result of the performing of the data attribute calculation to the client computer.

17. The non-transitory computer-readable storage medium of claim 16, wherein the data attribute calculation includes pattern recognition on one or more columns of the data.

18. The non-transitory computer-readable storage medium of claim 16, wherein the performing the data attribute calculation includes creating a logical execution plan for the data attribute calculation, wherein the logical execution plan breaks the data attribute calculation into a plurality of sub-calculations based on columns of the data, wherein each sub-calculation is assigned to a different computing cluster for execution in parallel.

19. The non-transitory computer-readable storage medium of claim 16, wherein the command is a Structured Query Language (SQL) command.

* * * * *